United States Patent [19]
Lawrence

[11] Patent Number: 6,024,554
[45] Date of Patent: *Feb. 15, 2000

[54] DOUGH SHEETING APPARATUS

[75] Inventor: Eric C. Lawrence, South El Monte, Calif.

[73] Assignee: Lawrence Equipment, South El Monte, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/957,334

[22] Filed: Oct. 24, 1997

[51] Int. Cl.$^7$ .............................. A21C 3/02; A21C 11/10
[52] U.S. Cl. ......................... 425/310; 425/363; 426/502
[58] Field of Search .................................... 426/502, 503, 426/517; 425/363, 403.1, 310, 311, 298, 449

[56] References Cited

U.S. PATENT DOCUMENTS

| | | | |
|---|---|---|---|
| 2,724,348 | 11/1955 | Neutelings et al. | 425/367 |
| 3,347,183 | 10/1967 | Einstein et al. | 425/363 |
| 3,589,308 | 6/1971 | Verhoeven | 425/449 |
| 4,405,298 | 9/1983 | Blair | 426/502 |
| 4,770,619 | 9/1988 | Rijkaart | 426/502 |
| 5,268,187 | 12/1993 | Quinlan | 426/502 |
| 5,378,133 | 1/1995 | Atwood et al. | 425/449 |
| 5,565,220 | 10/1996 | Rusio et al. | 426/503 |
| 5,626,898 | 5/1997 | Caridie et al. | 426/502 |
| 5,720,990 | 2/1998 | Lawrence et al. | 426/502 |

FOREIGN PATENT DOCUMENTS 3411428  10/1985  Germany ................. 426/502

*Primary Examiner*—James P. Mackey
*Attorney, Agent, or Firm*—Lyon & Lyon LLP

[57] ABSTRACT

A food product sheeter includes first, second, third and fourth rollers rotatably supported on a frame. The fourth roller is positioned above the first and second rollers, and is separated from the first roller by gap which serves as the entrance for dough into the sheeter. The fourth roller acts as a pressurizing roller and drives the food product into a slot between the first and second rollers. The third roller engages against the first roller to cut out food product shapes. The first and second rollers can have smooth non-stick surfaces to facilitate release of the cut-out food product shapes, without gaps or voids forming in them. In a second embodiment, the first roller has a pattern of non-stick surfaces, for example, in the shape of circles. The non-stick surfaces facilitate release of the cut food product shapes off the first roller. The pattern of the non-stick surface on the front roller is indexed to the cutting surfaces on the third roller, to maintain them in registration.

24 Claims, 3 Drawing Sheets

Fig. 3
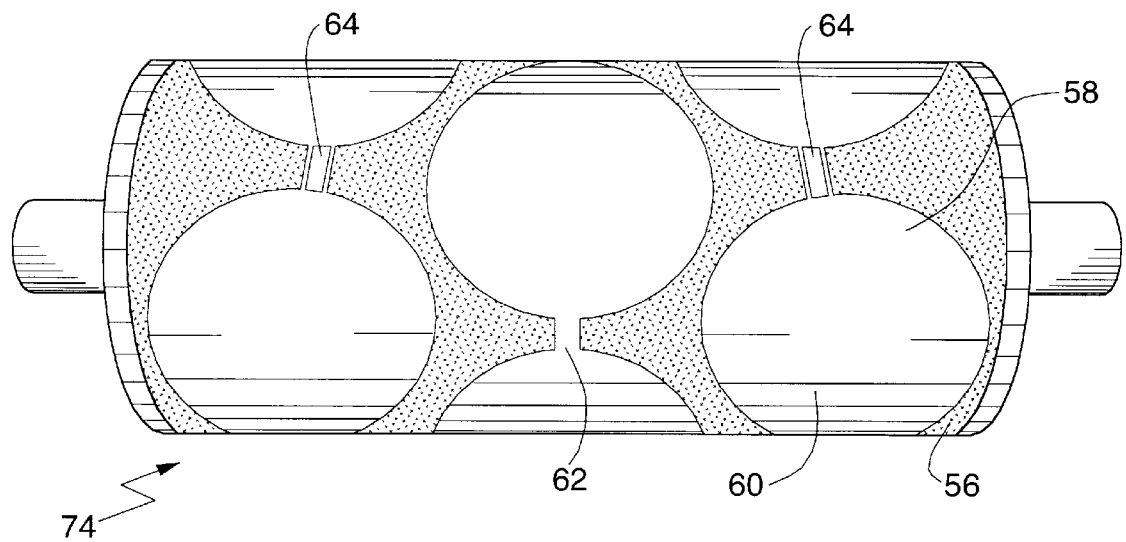
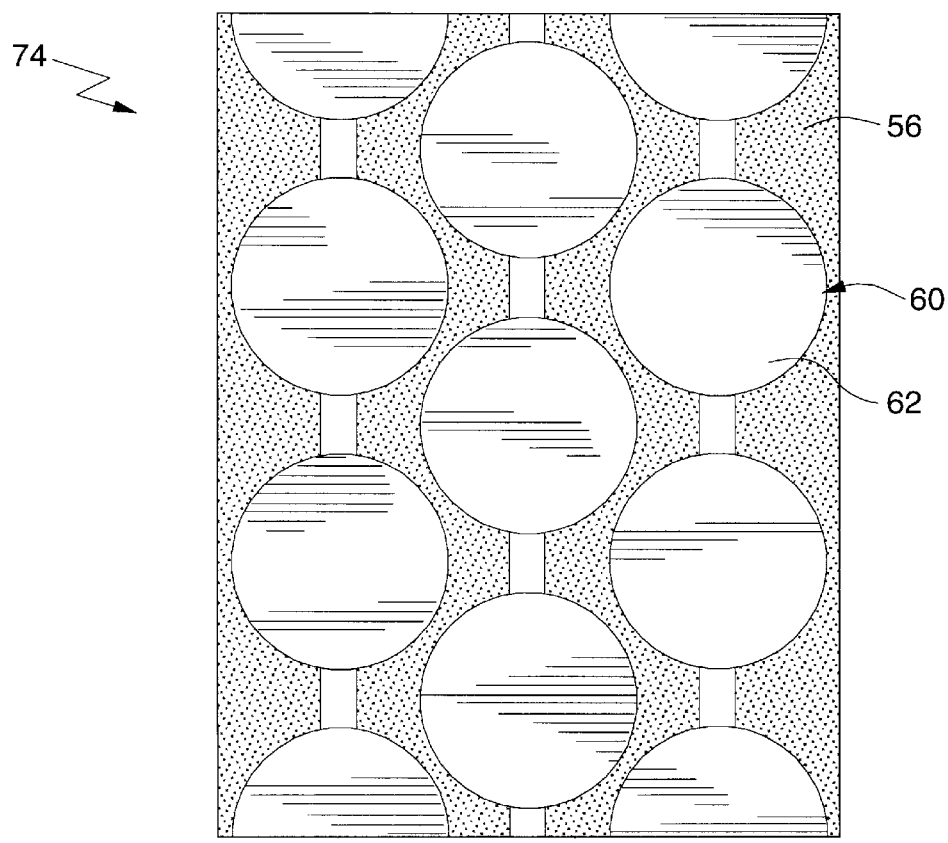
Fig. 4

DOUGH SHEETING APPARATUS

BACKGROUND OF THE INVENTION

The field of the invention is dough sheeter machines.

Dough sheeter machines are used to produce relatively thin sheets of dough, to make food products such as tortillas and chips. For these types of products, masa is made from wet milled corn, i.e., corn flour, water and other ingredients. The dough is rolled into a thin sheet by pressing and rolling the dough between rollers. A cutting or die roller is pressed against a front roller, to cut out the selected shape for the product. For example, tortillas are cut in a round shape, whereas chips may be cut in triangular shapes. After cutting, the food product is generally toasted, baked or fried, and then packaged. While sheeters or dough sheeting machines are most often used with masa, they may also be used with other food products, such as doughs made from rice, wheat, etc.

While the physical properties of doughs vary among batches of masa or other food products, most doughs have certain adhesive qualities which tend to cause the dough to stick to the rollers of sheeting machines. After the food product is cut into the desired shape by the die roller, the cut shapes must be separated from the front roller and conveyed from the sheeting machine to a subsequent (for example, a baking) station for further processing. The web remaining on the front roller after cutting makes up a significant fraction of the dough fed into the machine. Consequently, for economical operation, the web must be returned for refeeding into the sheeter machine.

Various techniques have been proposed for separating the cut food product shapes from the front roller, and for returning the web to the supply of dough being fed into the sheeter machine. These techniques include use of stripper wires, concave rollers, doctor blades and varying roller speeds. Stripper wires, i.e., wires tensioned across the front roller, are widely used. Bands have also been used in sheeter machines to help return the web back into the sheeter machine. Yet significant difficulties remain in the design and operation of sheeter machines.

Most sheeter machines have used a roughened or sandblasted front roller and a smooth, e.g., Teflon coated rear roller. The rough surface on the front roller has been required to pull the dough down into the space or gap between the front and rear rollers. Without this rough surface, the dough slips excessively and does not reliably feed into the gap. This causes air pockets or voids in the food product. Unfortunately, while the rough front roller surface reduces or avoids air pockets, it also places high loads on the stripper wires, as the food product sticks tightly to the rough surface. The stripper wires have to cut or shear through the food products or tortillas, leaving them with a rough surface. As a result, the stripper wires wear out frequently and must be replaced. This requires the sheeter machine to be shut down. If the dough is allowed to dry on the rough front roller, removing it can become very difficult. The length of the stripper wires, and hence the length of the front roller is also severely limited due to the high loads placed on the stripping wires in shearing through the dough. This limit on the length of the roller limits the manufacturing capacity of the machine.

In addition, using these known designs causes the quality of the food product to suffer, because the rough surface of the wire stripped food product looses excessive moisture in subsequent baking or toasting operations. The end product has less retained moisture, and a rough surface. These are undesirable characteristics, especially for tortillas.

SUMMARY OF THE INVENTION

The food product sheeter machine of the present invention preferably includes a frame and first, second, third and fourth rollers. The rollers are advantageously rotatably supported on the frame. The second or rear roller is spaced from the first or front roller by a first slot. The third or die cutting roller is preferably in rolling contact or near contact with the first or front roller. The fourth or pressurizing roller is most desirably positioned above the first and second rollers. The fourth roller is separated from the rear or second roller by a slot selected so that the fourth roller acts as a pressurizing roller driving the food product into the first slot.

In another embodiment, the first or front roller includes a pattern of non-sticking surfaces, to better facilitate release and separation of the cut food product shapes.

BRIEF DESCRIPTION OF THE DRAWINGS

Other objects and features of the present invention will become apparent from the following detailed description read with the accompanying drawings. It should understood, however, that the drawings are provided for purpose of illustration only, and are not intended as a definition of the limits of the invention.

In the drawings, wherein similar reference characters denote similar elements throughout the several views:

FIG. 3 is a perspective view of the front roller shown in FIG. 2 having a non-stick surface; and FIG. 4 is a pattern view of the surface of the roller shown in FIGS. 2 and 3.

DETAILED DESCRIPTION OF THE PREFERRED EMBODIMENT

Figure 1:
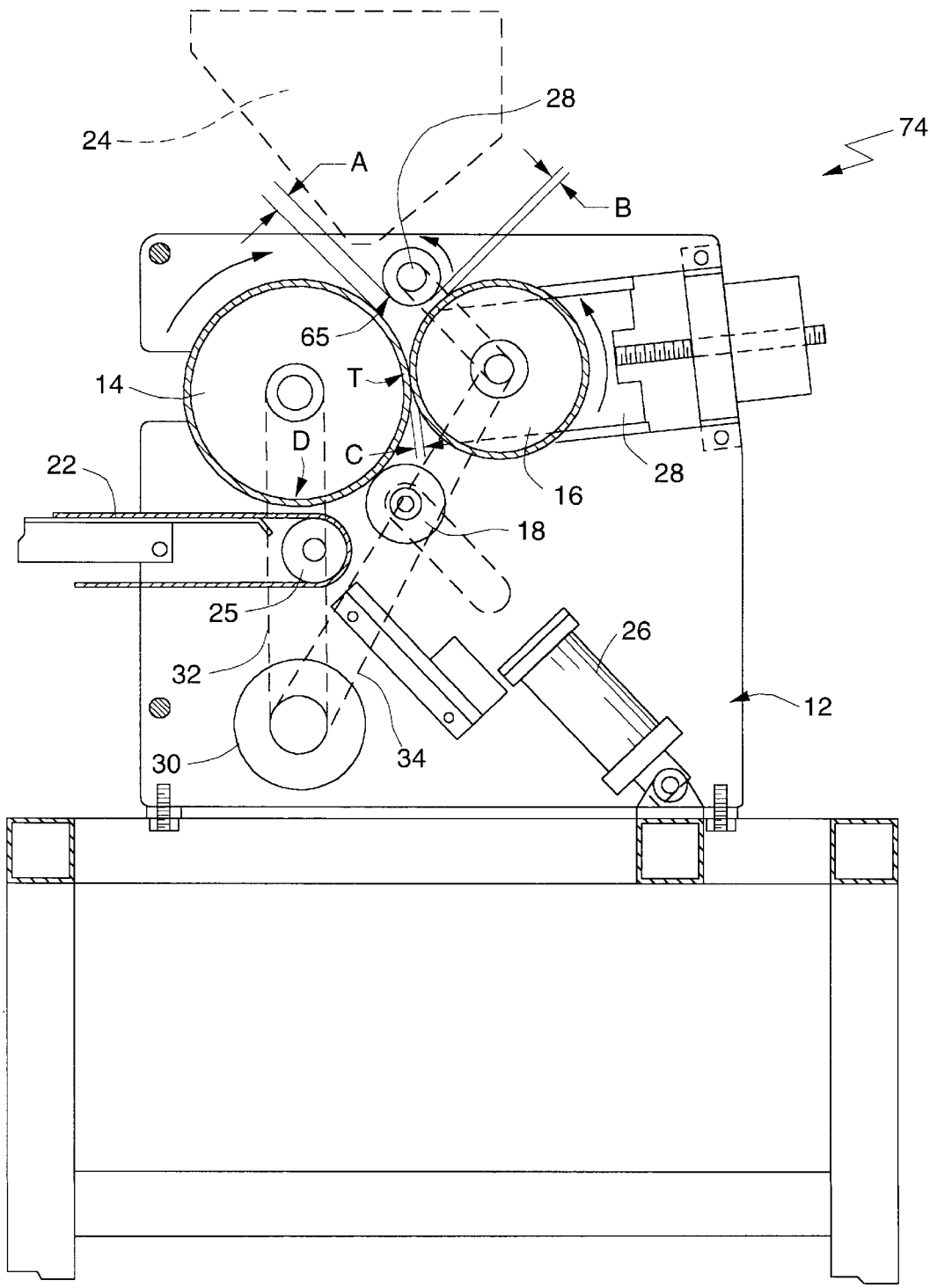
FIG. 1 is a schematically illustrated side elevation view of a first embodiment of the present sheeter machine.

As shown in FIG. 1, a sheeter machine 10 includes a frame 12. A front roller 14, a rear roller 16, and a die or cutting roller 18 are rotatably supported on the frame 12. A conveyor belt 22 is positioned under the front roller 14. The back end of the conveyor belt 22 is supported on the a belt roller 25. A hopper 24 or other container is positioned above the sheeter machine 10, to supply raw dough to the sheeter 10.

A die roller positioner 26 adjusts the position of the die roller 18 relative to the front roller 14. Similarly, a rear roller positioner 28 adjusts the position of the rear roller 16 relative to the front roller 14.

An electric motor 30 turns the front roller 14 and the rear roller 16 via drive chains or belts 32 and 34. Additional gearing or sprockets may be used to select the desired speed and direction of rotation of the rollers.

Referring still to the embodiment of FIG. 1, a pressurizing roller 20 is positioned above the front roller 14 and the rear roller 16. The pressurizing roller 20 is also rotatably mounted on the frame 12. The pressurizing roller 20 is positioned so that the slot or space B between the surface of the pressurizing roller 20 and the surface of the rear roller 16 is from about 0.01 to 0.05 inches, preferably about 0.02 inches. The slot or space A between the surface of the pressurizing roller 20 and the surface of the front roller 14 is about ⅜ to ½ inch. The pressurizing roller 20 is turned in the same direction (counterclockwise as shown by the arrows in FIG. 1) as the rear roller 16 via a belt or chain 21 linked to the rear roller 16, or by a similar chain or belt connection to the motor 30. The slot C between the front roller 14 and the rear roller 16 is selected depending upon the desired thickness of the food product. The surface of the front roller 14 is smooth, to avoid having the dough stick to it, yet also hard, to resist wear from the stripper wires rubbing against it. Preferably, the front roller 14 surface is a matrix of TEFLON™ (tetraflouropolyethylene) and titanium, but of course various other materials may be used equally as well. The back roller is preferably Teflon (tetraflouropolyethylene) coated and ceramic reinforced. The pressurizing roller is preferably steel with a sand blasted and roughened surface.

The front roller linear surface speed is faster than the back roller, which in turn is faster than the pressurizing roller. The front roller turns at about 80 ft./min., the back roller at about 50 ft./min., and the pressurizing roller at about 10 ft./min. The pressurizing roller 20 and the front roller turn in opposite directions, driving the dough between them and into the slot C.

Referring to FIG. 1, in use, dough, such as masa, is supplied to the hopper 24. The dough moves down through a feed point 65 between the pressurizing roller 20 and the front roller 14. The compressing and rolling action of the pressurizing roller 20 and the front roller 14 flatten the dough into a sheet having a thickness equal to the slot A. The much smaller slot B and turning movement of the rear roller 18 largely prevents the dough from extruding out of the feed area through slot B.

The sheet then continues to move down and is rolled between the front roller 14 and the rear roller 16. This further flattens the sheet of dough to a thickness C, set by adjusting the slot between the front roller 14 and rear roller 16 using the positioner 28. The front roller 14 and the rear roller 16 both have a smooth surface which the food product does not readily adhere to. Air pockets and voids in the food product are avoided though because the pressurizing roller forces the dough down into the first slot. Ordinarily, using smooth non-stick rollers, the tortillas produced would have voids due to the absence of compression on the dough. However, the pressurizing roller 20 positively drives the dough into the slot or gap A and reduces the tendency to produce voids in the food product, even when using smooth non-stick front and rear rollers.

Consequently, as the sheet of dough moves down from the point at T in FIG. 1, the sheet stays only lightly adhered to the front roller 14. The cutting or die roller 18 is pressed against and is in rolling engagement with the front roller 14. The position of the die roller 18 is selected using the positioner 26. The die roller cuts out the food product shapes.

As the cut dough shapes move to point D in FIG. 1, they are easily stripped away from the smooth non-stick surface of the front roller 14 by the stripping wires, as they do not adhere well to the front roller non-stick surface. After dropping off the front roller 14, the cut shapes are moved on the conveyor belt 22 to a next processing station for, e.g. baking.

As the cut out food product shapes are easily stripped off of the front roller, the stripper wires 35 tend to peel the shapes off, rather than cut them off of the front roller. This results in a smooth surface which better contains moisture in subsequent cooking or heating steps. The smooth surface and higher moisture are desirable qualities, for tortillas. As the loads on the stripper wires 35 are reduced, the wires can be replaced less often, increasing productivity.

The remaining web or uncut areas of the sheet are carried up and around on the front roller and back to the pressurizing roller.

Figure 2:
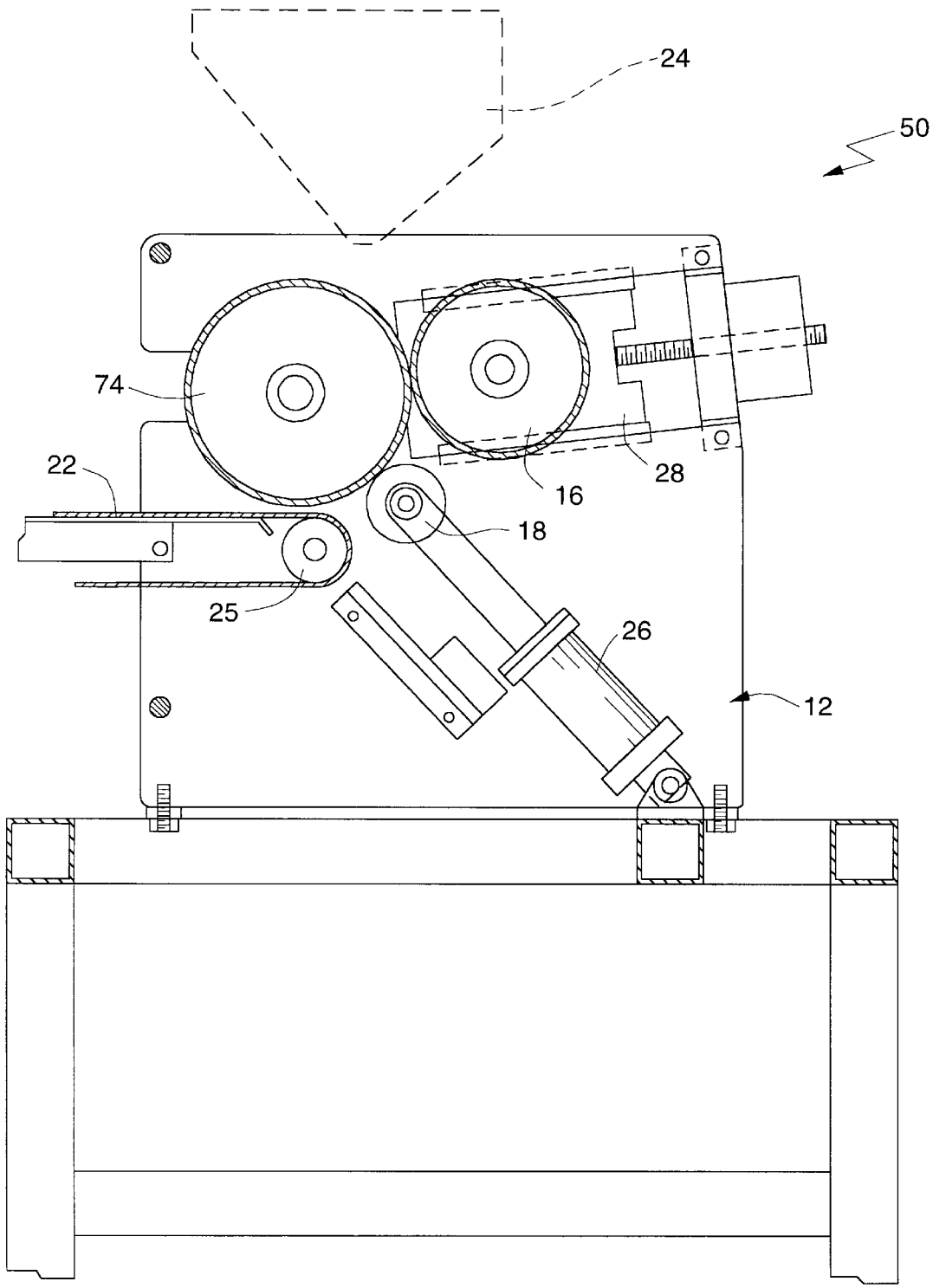
FIG. 2 is a schematically illustrated side elevation view of a second embodiment.

FIGS. 2–4 show an alternative embodiment, similar to the embodiment shown in FIG. 1. The embodiment 50 shown in FIG. 2 operates more like a conventional sheeter, except that the front roller 74 includes a pattern of non-stick surfaces 58, to better facilitate separation of the cut food product shapes. The pressurizing roller 20 may or may not be used with the patterned roller shown in FIGS. 3 and 4.

Referring to FIGS. 3 and 4, in the second embodiment, the front roller 74 is preferably made of stainless steel. The pattern of non-stick surfaces 58 is provided in the form of circles 60 in the embodiment shown, on the front roller surface. Other patterns, such as triangles for making tortilla chips, may also be used. The non-stick surface 58 is preferably Teflon, or SILVERSTONE™, for example, Rockwell 60 hardness. The web 56 or areas surrounding the non-stick surfaces 58 are roughened stainless steel. The circle 60 are connected together in the direction of rotation by gaps 62, as shown in FIG. 3. The gaps 62 are also a non-stick surface, but may include a small island 64 of the roughened stainless steel surface. The die roller 18 has a pattern of die cutting circles on its surface which match the circles 60 of the non-stick surface 58 on the front roller 74. The die roller 18 is also indexed with the front roller 74 to maintain proper alignment or registration of the circular cutting surfaces on the die roller 18 and the circles 60 on the front roller 74. Preferably, the die roller 18 is geared directly to the front roller 74, to drive the die roller 18, and to maintain the registration.

The non-stick surfaces 58 on the front roller 74 therefore allow separation of the cut food product shapes, without the need for a wire, doctor blade, or other devices. The non-stick surfaces also allow the sheeter 10 to produce smoother tortillas than previously possible.

Thus, a novel food product sheeter has been shown and described. Various modifications and substitutions of equivalents may of course be made without departing from the spirit and scope of the invention. The invention, therefore, should not be restricted, except by the following claims and their equivalents.

What is claimed is:

1. A food product sheeter machine comprising:

a frame;

a first roller rotalably supported on the frame;

a second roller rotatably supported on the frame and spaced apart from the first roller by a first gap;

a third roller in rolling contact with the first roller; and a fourth roller rotatably supported on the frame and separated from the first roller by a second gap such that dough can pass therebetween through the second gap, and the fourth roller separated from the second roller by a third gap such that dough cannot pass therebetween through the third gap.

2. The food product sheeter machine of claim 1 wherein the fourth roller has a roughened surface.

3. The food product sheeter machine of claim 1 wherein the fourth roller is vertically aligned over the first gap.

4. The food product sheeter of claim 1 further comprising a hopper positioned above the first and second rollers and supplying dough onto the first and second rollers.

5. The food product sheeter of claim 1 wherein the first roller has a smooth cylindrical surface.

6. The food product sheeter of claim 3 wherein the fourth roller is also positioned between the first and second rollers.

7. The food product sheeter machine of claim 1 wherein the second gap, between the fourth roller and the first roller, is about ⅜ to ½ inch.

8. The food product sheeter of claim 1 wherein the fourth roller is separated from the second roller by a third gap of about from 0.01 to 0.05 inch.

9. The machine of claim 1 wherein the first roller has a diameter larger than that of the second roller, and the second roller has a diameter larger than that of the third roller.

10. The machine of claim 1 wherein the fourth roller includes a die pattern for cutting food product shapes.

11. The machine of claim 1 wherein the first and second rollers have a smooth cylindrical surface and the fourth roller has a rough cylindrical surface.

12. The machine of claim 1 wherein the third and fourth rollers are separated from each other by the first and second rollers.

13. The machine of claim 1 wherein the third roller is above the first and second rollers.

14. The machine of claim 1 further comprising a smooth cylindrical surface on the first and second rollers.

15. The machine of claim 13 wherein the third roller is closer to the second roller than to the first roller.

16. The machine of claim 1 further comprising means for rotating the first roller in a first direction and for rotating the second, third and fourth rollers in a second direction opposite to the first direction.

17. The machine of claim 1 further comprising means for supplying a food product material to a space between the first roller and the third roller.

18. The machine of claim 1 wherein the third roller is spaced apart from the second roller by 0.01–0.05 inch gap.

19. A food product sheeter comprising:
   a frame;
   a first roller rotatably supported on the frame, the first roller having a smooth cylindrical surface;
   a second roller rotatably supported on the frame and spaced apart from the first roller by a first gap;
   a hopper positioned above the first and second rollers and supplying dough onto the first and second rollers;
   a third roller engaging the first roller;
   a fourth roller spaced apart from the first roller by a second gap and spaced apart from the second roller by a third gap, and with the second gap allowing dough to pass therethrough and third gap not allowing dough to pass therethrough.

20. A food product sheeter, comprising:
   a frame;
   a first roller rotatably supported on the frame, the first roller having a roughened surface and a pattern of non-sticking surfaces overlying a portion of the roughened surface;
   a second roller rotatably supported on the frame and spaced apart from the first roller by a first gap;
   a third roller in rolling contact with the first roller; and
   a fourth roller spaced apart from the first roller by a second gap, and spaced apart from the second roller by a third gap.

21. The food product sheeter of claim 20 wherein the non-stick surface comprises tetrafluororolyethylene.

22. The food product finisher of claim 20 wherein the pattern comprises spaced apart non-overlapping circles.

23. The food product finisher of claim 22 wherein the circles are joined by bridges.

24. The food product finisher of claim 20 wherein the roughened surface comprises stainless steel and non-stick surface comprises Silverstone.

* * * * *